(12) United States Patent
Shimoyama (10) Patent No.: US 11,433,542 B2
(45) Date of Patent: Sep. 6, 2022

(54) CALIBRATION DETECTING APPARATUS, METHOD, AND PROGRAM

(71) Applicant: Kabushiki Kaisha Toshiba, Tokyo (JP)

(72) Inventor: Kenichi Shimoyama, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 251 days.

(21) Appl. No.: 16/802,987

(22) Filed: Feb. 27, 2020

(65) Prior Publication Data

US 2020/0384650 A1 Dec. 10, 2020

(30) Foreign Application Priority Data

Jun. 5, 2019 (JP) .............................. JP2019-105591

(51) Int. Cl.
*B25J 9/16* (2006.01)
*B25J 19/02* (2006.01)

(52) U.S. Cl.
CPC ........... *B25J 9/1692* (2013.01); *B25J 9/1694* (2013.01); *B25J 19/022* (2013.01)

(58) Field of Classification Search
CPC ...... B25J 9/1692; B25J 9/1694; B25J 19/022; B25J 19/0037; B25J 9/10; B25J 13/089; B25J 19/021; B25J 19/023; G05B 2219/37288; G05B 2219/37571; G05B 2219/39033; G05B 2219/40623; G05B 2219/34103; G06T 7/80

See application file for complete search history.

(56) References Cited

U.S. PATENT DOCUMENTS

| | | | |
|---|---|---|---|
| 2015/0375396 A1* | 12/2015 | Shirakyan | B25J 9/1674 700/254 |
| 2018/0043471 A1* | 2/2018 | Aoki | B23K 26/0884 |
| 2019/0187661 A1* | 6/2019 | Yanaka | G01B 9/02072 |

FOREIGN PATENT DOCUMENTS

| | | |
|---|---|---|
| JP | 5234255 | 11/2009 |
| JP | 2017-026551 | 2/2017 |

* cited by examiner

*Primary Examiner* — Abby Y Lin
*Assistant Examiner* — Esvinder Singh
(74) *Attorney, Agent, or Firm* — Knobbe, Martens, Olson & Bear, LLP

(57) ABSTRACT

According to one embodiments, a calibration detecting apparatus includes a generator, a setting unit, an acquisition unit, and a calculator. The generator generates location data indicating a group including a pair of two positions arranged respectively in two spaces. The setting unit sets an irradiation arrangement so that an irradiating device performs laser irradiation on a region including an end position of the end effector. The acquisition unit acquires observation data indicating whether or not the end effector is observed. The calculator calculates a change in an installed state of the irradiating device based on the observation data.

17 Claims, 10 Drawing Sheets

When installed

After years of installation

| | P1 | P2 | P3 | P4 | P5 | P6 | P7 | P8 | P9 |
|---|---|---|---|---|---|---|---|---|---|
| U | × | × | × | × | × | × | × | × | × |
| D | ○ | ○ | ○ | ○ | ○ | ○ | ○ | ○ | ○ |

F I G. 15

F I G. 16

|   | P1 | P2 | P3 | P4 | P5 | P6 | P7 | P8 | P9 |
|---|----|----|----|----|----|----|----|----|----|
| U | × | × | × | × | × | × | × | × | × |
| D | ○ | ○ | × | ○ | ○ | × | ○ | ○ | × |

|   | P1 | P2 | P3 | P4 | P5 | P6 | P7 | P8 | P9 |
|---|----|----|----|----|----|----|----|----|----|
| U | × | × | × | × | × | × | × | × | × |
| D | × | × | × | ○ | ○ | ○ | ○ | ○ | ○ |

CALIBRATION DETECTING APPARATUS, METHOD, AND PROGRAM

CROSS-REFERENCE TO RELATED APPLICATIONS

This application is based upon and claims the benefit of priority from Japanese Patent Application No. 2019-105591, filed Jun. 5, 2019, the entire contents of all of which are incorporated herein by reference.

FIELD

Embodiments described herein relate generally to a calibration detecting apparatus, method, and program.

BACKGROUND

As a measurement device used for controlling robots, etc., there is a device that measures a distance from the device to an object by performing laser scanning in a predetermined direction. In the case of such a measurement device, a scanning surface formed by performing laser scanning should be made to match a desired plane surface. For example, an operator may use a level, etc. to install the measurement device so that the scanning surface matches a desired surface.

However, in some cases, the installed state of the measurement device may change due to secular variation, etc., and cause the scanning surface to be mismatched with the desired surface. Furthermore, in some cases, the scanning surface of the measurement device may not include visible light, which would make adjustments difficult for the operator. Therefore, a technique to detect changes in the scanning surface is desired.

DETAILED DESCRIPTION

Hereinafter, an embodiment according to one aspect (hereinafter, also described as the "present embodiment") will be explained with reference to the drawings. In the following embodiment, explanations will be omitted for those portions with identical numbers, assuming that they perform the same operations.

In a conventional method, the installation of a measurement device was adjusted by utilizing a flat plate with right angles or a laser marker. By using such a method, a change in a scanning surface is able to be detected. However, using such a method has been extremely troublesome because a dedicated device, etc. is required.

The object of the embodiments is to provide a calibration detecting apparatus, method, and program that is capable of detecting secular variation in the installed position and direction of the measurement device without having to use a special device.

According to one embodiments, a calibration detecting apparatus includes a first generator, a setting unit, a second generator, an acquisition unit, and a calculator. The first generator generates location group data indicating a location group that includes at least a pair of at least two positions arranged respectively in two spaces which are obtained by dividing a space by a planar region including a distal end position of an end effector and a position of a laser source. The setting unit sets an irradiation arrangement so that an irradiating device performs laser irradiation on a region including the distal end position. The second generator generates transfer data for moving the distal end position to at least one position among positions indicated by the location group data. The at least one position is designated within a range including a first space which is at least one of the two spaces. The acquisition unit acquires observation data indicating whether or not the end effector is observed by performing laser irradiation in a state of the irradiation arrangement each time the distal end position is moved in accordance with the transfer data. The calculator calculates a change in an installed state of the irradiating device based on the observation data.

[Overview]

First, an overview of a system including a calibration detecting apparatus, a robot, and an irradiating device of an embodiment will be explained with reference to FIG. 1.

Figure 1:
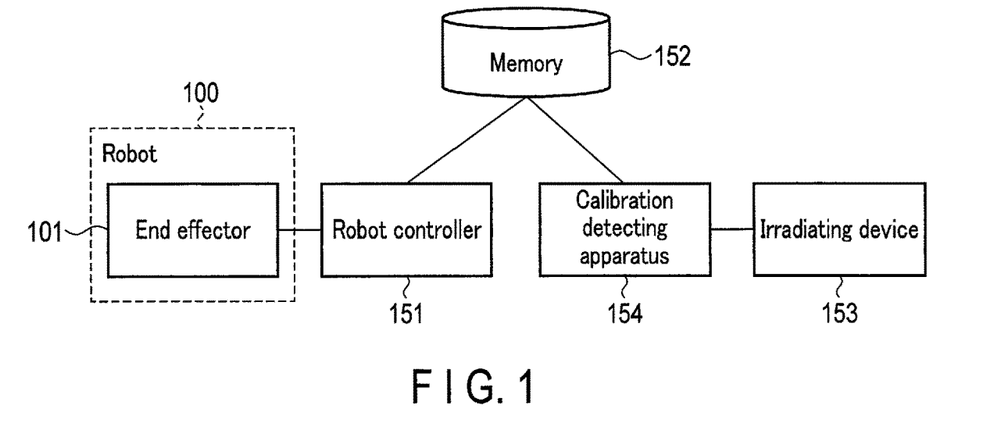
FIG. 1 shows an overview of a system including a calibration detecting apparatus (also referred to as a data processor), a robot comprising an end effector, and an irradiating device (also referred to as a measurement device) according to an embodiment.

FIG. 1 schematically exemplifies a robot 100, a robot controller 151, a memory 152, an irradiating device 153, and a calibration detecting apparatus 154 according to an example of the overview of the present embodiment. The irradiating device and the calibration detecting apparatus will also be referred to as a measurement device and a data processor, respectively.

The robot 100 comprises an end effector 101, and performs a predetermined operation under the control of the robot controller 151. Furthermore, the end effector 101 is a device attached to the distal end of a manipulator. The manipulator is configured by segments that are coupled to each other, and is a device for grabbing or moving an object.

The robot 100 can also move the end effector 101 to a desired position within a possible range of movement of the robot. The robot 100, for example, uses the end effector 101 to pick up an article and move it to a predetermined place. The robot 100 can perform various operations other than those explained herein. For example, the robot 100 may have a suction device that suctions an article attached to the end effector, and carry the article. Furthermore, as a device to be attached to the end effector, there is a device for welding or coating, etc. Hereinafter, in the present embodiment, an example of using a hand for pickup (hereinafter, referred to as a hand), to which a device for pickup is attached, will be explained as the end effector 101. Hereinafter, the hand indicates the end effector 101, and vice versa.

The robot controller 151 controls general processing related to the robot, including the operation of the robot 100. Therefore, the robot controller 151 also controls the operation of the end effector 101. The robot controller 151, for example, acquires data related to a predetermined operation content of the robot 100 from the memory 152, and controls the robot 100 by executing a program.

The memory 152 at least stores transfer data for moving the distal end position (also referred to as an end-point position) of the end effector to a predetermined position, and, also, acquires and stores an installed state of the irradiating device 153, which is observed by the irradiating device 153 and processed by the calibration detecting apparatus 154. The memory 152 may also store control data related to a predetermined operation of the robot 100, or may further store a program to be executed by the robot controller 151. The memory 152 may also store location data of the distal end position and an arrangement of the irradiating device 153 when the arrangement of the irradiating device 153 is initially set with respect to the distal end position of the end effector 101.

The irradiating device 153 is for observing whether or not the end effector 101 is present at a predetermined position. In the present embodiment, a case in which the irradiating device 153 uses a laser range finder (LRF) as the measurement device will be explained. The LRF can measure the distance of an object that is on a two-dimensional scanning surface in real space. The irradiating device 153 may also use a camera or a line scanner, etc. instead of the LRF. The irradiating device 153 measures whether or not the end effector 101, an item grasped by the end effector 101, or the distal end position of the end effector 101, etc. is at a predetermined position.

Figure 2:
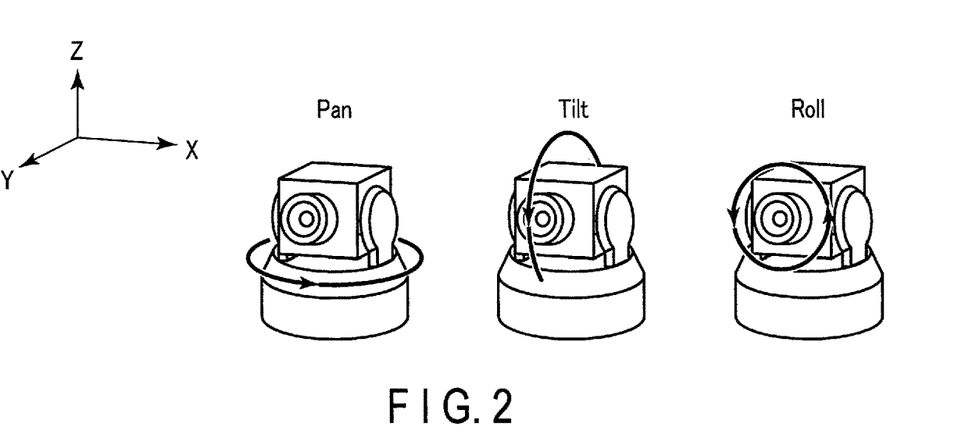
FIG. 2 shows directions in which the irradiating device of FIG. 1 may be directed.

As shown in FIG. 2, the LRF may change the direction of the scanning surface in three ways. FIG. 2 explains how the direction of the LRF changes. XYZ axes are arranged in the manner shown in FIG. 2. In a case where an XY plane is a horizontal plane, the change of the scanning surface about an X axis is referred to as a tilt change, the change of the scanning surface about a Y axis is referred to as a roll change, and the change of the scanning surface about a Z axis is referred to as a pan change. Although the names of the changes in the present embodiment are defined in the above manner, the names of the changes are not limited thereto. Therefore, they may be any other names as long as the names specify the changes that differ depending on how the scanning surface is rotated with respect to the horizontal plane.

Figure 3:
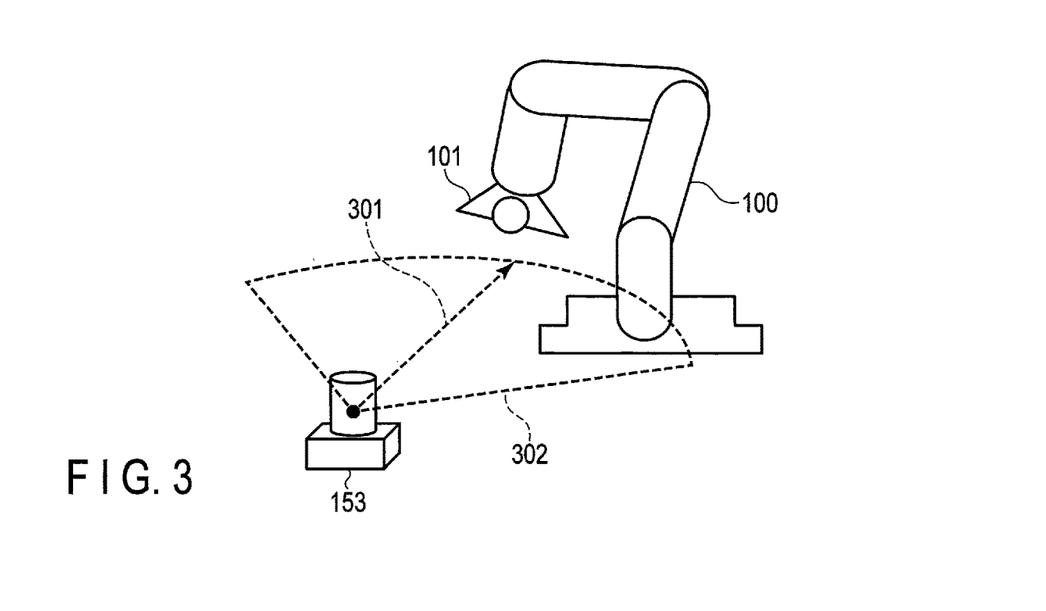
FIG. 3 shows the robot comprising the end effector and a laser range finder (LRF), which is the irradiating device, in the system shown in FIG. 1.

Furthermore, the LRF is arranged at a position where the end effector 101 attached to the robot 100 can be easily measured. For example, the LRF is arranged at the front of the robot 100 in the manner shown in FIG. 3. The LRF performs laser irradiation towards the end effector 101 of the robot 100 on a scan surface 302, centering on a central axis 301. The arrangement of the LRF is not limited thereto. The LRF may be arranged at various places, such as at the side or back of the robot, as long as it is possible to measure the end effector 101.

The calibration detecting apparatus 154 calculates the change in the installed state of the irradiating device 153 based on transfer data that indicates a plurality of transfer positions of the distal end position of the end effector and observation data observed by the irradiating device 153. The calibration detecting apparatus 154 detects the change in the relative relation between the scanning surface and the end effector 101 from data measured by the irradiating device 153 (for example, the LRF). Details of the calibration detecting apparatus 154 will be explained with reference to FIG. 5 and FIG. 6.

Figure 4:
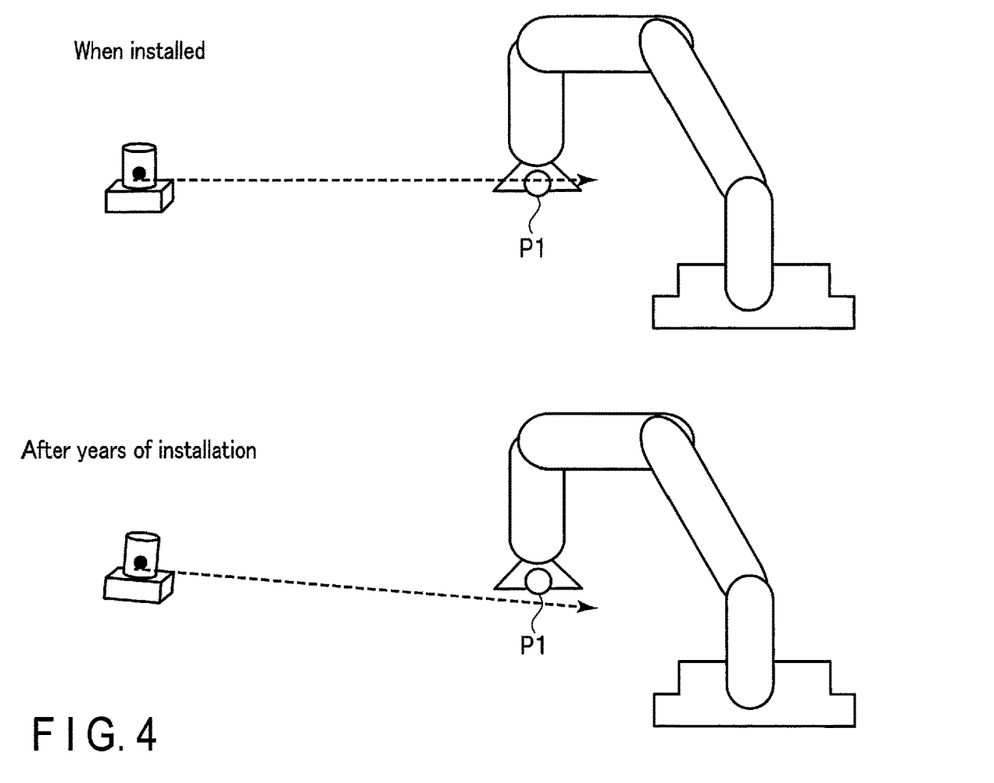
FIG. 4 shows a typical example of a change in a positional relationship due to secular variation between a distal end position (also referred to as an end-point position) of the end effector and a scanning surface of the LRF shown in FIG. 3.

FIG. 4 shows a basic idea for detecting positional changes in the position of the irradiating device 153 over time. When the irradiating device 153 is being installed, and the scanning surface of the irradiating device 153 is moved to the distal end position (end-point position P; also simply referred to as an end-point) of the end effector 101, the end-point is observed at the LRF. In a case where the tilt change has occurred to the irradiating device 153 over time, and the distal end of the end effector 101 is moved to the same end-point position P and observed, the distal end of the end effector 101 will not be observed. Therefore, in the case where the scanning surface position of the LRF is changed, the observation result changes. That is, as long as the change in the observation result may be confirmed, the change in the scanning surface position can be detected. Furthermore, the change in the observation result caused by the irradiating device 153 in such a case is expressed by binary observation data, such as whether the distal end of the end effector 101 was observed or not, and not by the change in a measured distance value. Although the LRF is capable of measuring the distance, since noise prevents the LRF from accurately measuring the range of the distance, the LRF has difficulty in determining the change in the distance. On the other hand, the judgment about the change in whether or not the distal end of the end effector is observed, which is adopted by the present embodiment, is hardly affected by noise; therefore, has extremely high robustness.

<Calibration Detecting Apparatus 154>

Figure 5:
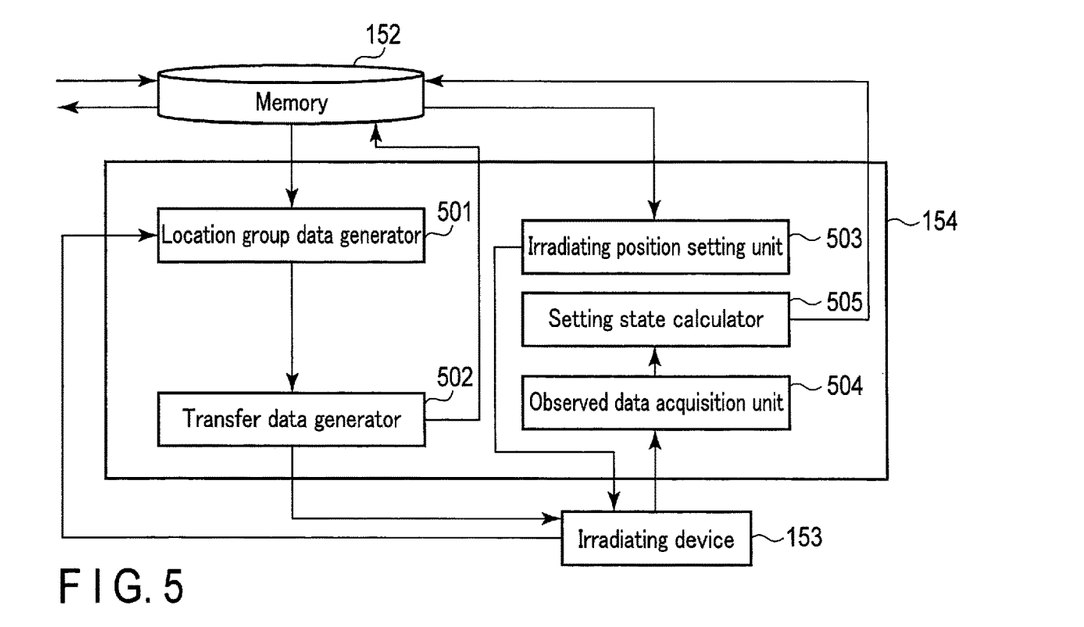
FIG. 5 is a block diagram schematically exemplifying an example of the calibration detecting apparatus according to the embodiment.

An example of the configuration of the calibration detecting apparatus 154 according to the present embodiment will be explained with reference to FIG. 5. FIG. 5 shows a configuration for executing a program executed by the calibration detecting apparatus 154. The program is for setting the irradiating device 153 in such a manner that allows laser irradiation to be performed on the distal end position of the end effector, followed by moving the distal end position of the end effector to a position indicated by preset location group data to acquire observation data obtained by performing laser irradiation on each of the positions to which the distal end position is moved, and calculating the installed state of the irradiating device 153 from this observation data.

When executing a necessary program, for example, the calibration detecting apparatus 154 develops the program stored in the memory 152 on a RAM. The calibration detecting apparatus 154 then interprets and executes the program developed on the RAM by the CPU, and controls each constituent element. Therefore, as shown in FIG. 5, the calibration detecting apparatus 154 according to the present embodiment comprises a location group data generator 501, a transfer data generator 502, an irradiating position setting unit 503, an observed data acquisition unit 504, and a setting state calculator 505.

Based on the transfer data for moving the distal end position of the end effector 101 to a predetermined position, which is stored in the memory 152, the location group data generator 501 generates location group data that indicates a location group indicating a plurality of positions to which the distal end position of the end effector 101 is moved. The location group data indicates a location group that includes at least a pair of at least two positions arranged respectively in two spaces obtained by dividing a space by a planar region including the distal end position of the end effector and a position of a laser source. The planar region does not necessarily have to be flat, and may be a curved two-dimensional plane, as long as it is a region capable of dividing the space in two on both sides. Furthermore, the planar region may be arranged in any manner, and may be arranged, for example, in a horizontal plane. In this case, the location group data may be data that indicates a location group including at least a pair of at least two positions, which are, for example, arranged symmetrically with respect to the horizontal planar region including the distal end position of the end effector and the position of a laser source. Furthermore, the arrangement of the planar region is not limited thereto, and may be parallel to a plumb line, or may be tilted in relation to the horizontal plane.

The transfer data generator 502 generates transfer data for moving the distal end position of the end effector 101 to a position indicated by the location group data generated by the location group data generator 501. The transfer data generator 502 stores the transfer data in the memory 152, the robot controller 151 reads the transfer data from the memory 152, and the robot 100 sequentially moves the distal end position of the end effector 101 to a position indicated by the location group data. The transfer data generator 502 also passes the transfer data to the irradiating device 153. The end effector 101 moves to the position indicated by the transfer data and recognizes this. The irradiating device 153 then performs laser irradiation on the scanning surface. Therefore, each time the distal end position of the end effector 101 is moved to the position included in the location group data, the irradiating device 153 can observe whether or not the distal end position has been present at the position.

The irradiating position setting unit 503 generates setting data for setting an irradiation arrangement of the irradiating device 153 so that, when the location group data generator 501 generates the location group data, the irradiating device 153 performs laser irradiation on a region including a position where the distal end position of the end effector 101 was present, and passes this setting data to the irradiating device 153. The irradiating device 153 receives this setting data, and decides the arrangement thereof in accordance with the irradiation arrangement included in this setting data of the irradiating device 153. The irradiating device 153 remains arranged at a position where the laser source is present when the location group data generator 501 is preparing the location group data. In other words, when the location group data is being prepared, the irradiating device 153 is arranged so that it is included in a planer region which is set so that the distal end position of the end effector 101 and the position of the laser source of the irradiating device 153 are present at positions included in the location group data, which are arranged respectively in the two spaces obtained by dividing a space by the planar region. Regarding this arrangement of the irradiating device 153, the memory 152 stores positional data related to this arrangement, and the irradiating position setting unit 503 may acquire this positional data to generate the setting data.

The observed data acquisition unit 504 acquires the observation data from the irradiating device 153. The observation data indicates whether or not the end effector 101 has been observed by having the irradiating device 153 in a state of the irradiation arrangement perform laser irradiation on the distal end position of the end effector 101 each time it is moved in accordance with the transfer data that is generated by the transfer data generator 502. The observation data also includes the transfer data and is associated with the transfer data.

The setting state calculator 505 determines whether or not the installed state of the irradiating device 153 has changed based on a distribution of whether or not the end effector 101 was able to be observed at each position indicated by the location group data based on the observation data. If changed, the setting state calculator 505 determines how it has changed. Determination result data including this determination result is stored in the memory 152. Furthermore, the matter of how the installed state has changed can be determined by confirming the position at which the end effector has been observed and the position at which it has not been observed. Detailed examples of this determination will be explained later with reference to FIG. 8 to FIG. 20.

Furthermore, based on the obtained installed state, the setting state calculator 505 may calculate a revising method for restoring the arrangement to its originally installed arrangement. In this revising method, for example, the setting state calculator 505 generates revising data that indicates the direction and degree in which the irradiating device 153 should be moved and/or rotated in order to restore the installed state to the previous installed state. The revising method is indicated by this data.

<Others>

The operation of the calibration detecting apparatus 154 will be explained in detail by the following operation example. In the present embodiment, the calibration detecting apparatus 154 may be controlled by a general-purpose CPU. However, a part or all of the above operations (or functions) may be realized by one or a plurality of dedicated processors. Furthermore, aspects of the configuration of the calibration detecting apparatus 154 may be omitted, replaced and added to as appropriate in accordance with the embodiment.

[Operation Example]

An overview of the operation of the calibration detecting apparatus 154 will be explained with reference to FIG. 6.

Figure 6:
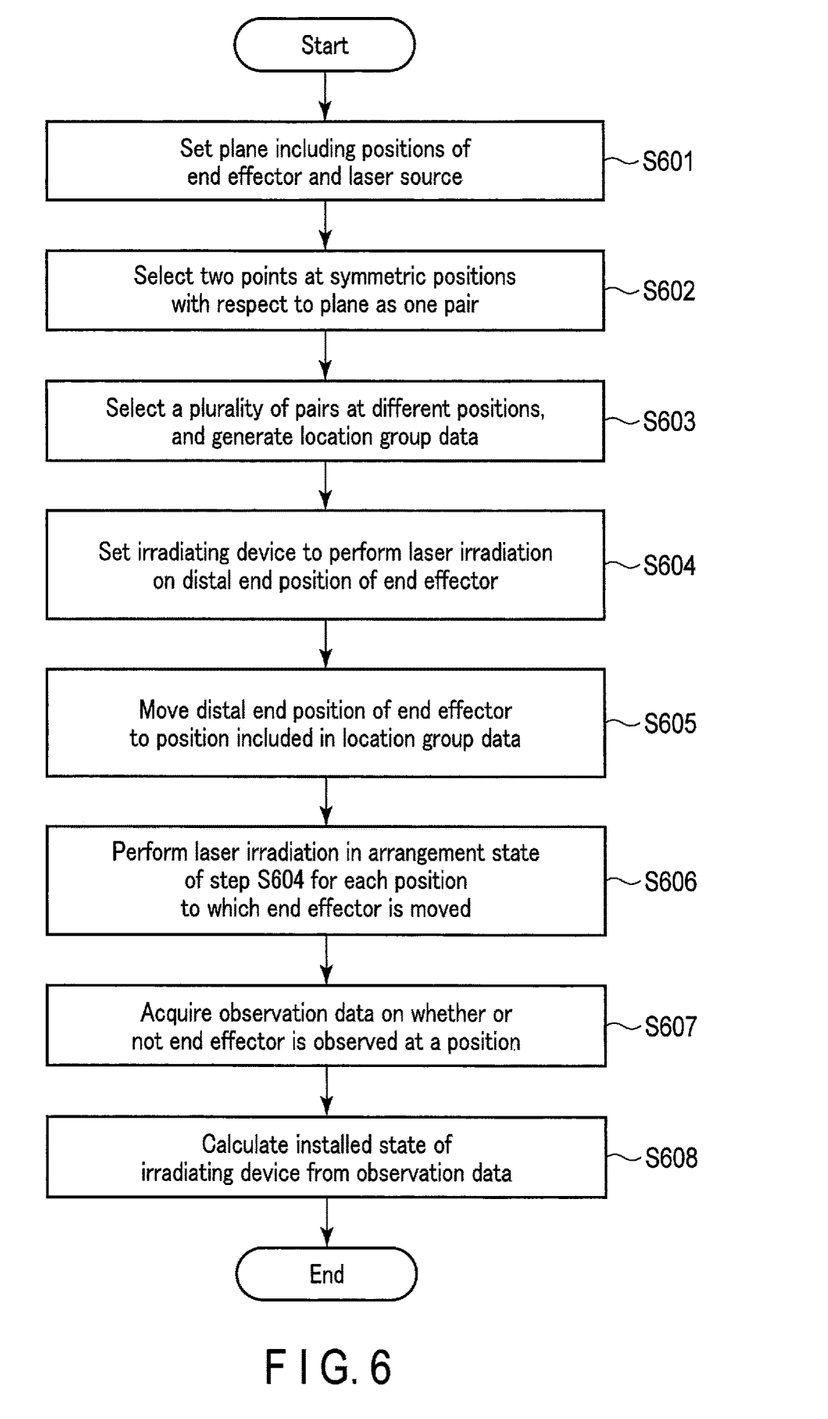
FIG. 6 is a flowchart schematically exemplifying an example of a processing procedure of the calibration detecting apparatus according to the embodiment.

FIG. 6 is a flowchart exemplifying an example of a processing procedure of the calibration detecting apparatus 154. The processing procedure explained below is only an example. Therefore, each processing may be changed wherever possible. Regarding the processing procedure explained below, steps may be omitted, replaced, and added as appropriate in accordance with the embodiment.

(Activation)

First, a user, etc. activates the calibration detecting apparatus 154 via an input device 2206 explained later, and, further, receives input of settings, etc. The calibration detecting apparatus 154 performs the processing in accordance with the following processing procedure.

(Step S601)

In step S601, the location group data generator 501 sets a plane including the distal end position of the end effector 101 and the position of the laser source of the irradiating device 153.

(Step S602)

In step S602, the location group data generator 501 selects two points that are positioned symmetrically with respect to the plane set in step S601 as a pair. In the embodiment, two points that are positioned symmetrically with respect to the plane are selected as an example; however, it is not limited thereto. Therefore, for example, at least two positions arranged respectively in two spaces obtained by dividing a space by a planar region may be selected as a pair.

(Step S603)

In step S603, the location group data generator 501 selects a plurality of pairs of the pair selected in step S602 that are symmetric with respect to the plane at different positions on the plane, and generates the location group data with these pairs as the location group. Each of the two points included in each of these pairs is at equal distances from the plane. These distances are usually equal for all of the pairs. However, these distances from the plane may be different distances among different pairs. In the case where the distance is different, the location group data is generated so as to include such distances from the plane.

(Step S604)

In step S604, the irradiating position setting unit 503 uses plane data received from the memory 152, which is used when obtaining the two symmetric points when generating the location group data, and generates the setting data for setting the irradiation arrangement of the irradiating device 153 so that the irradiating device 153 can perform laser irradiation on the region including a plane indicated by the plane data. The irradiating device 153 is installed based on such setting data.

(Step S605)

In step S605, the transfer data generator 502 generates transfer data for sequentially moving the distal end position of the end effector 101 to a position included in the location group data that is generated in step S603. The transfer data generator 502 stores this transfer data in the memory 152, and causes the robot controller 151 to move the distal end position of the end effector 101.

(Step S606)

In step S606, the irradiating device 153 performs laser irradiation on the end effector 101 in accordance with the installed state set in step S604. The irradiation is performed on each position to which the distal end position of the end effector 101 is moved by the transfer data generated by the transfer data generator 502.

(Step S607)

In step S607, each time the distal end position of the end effector 101 is moved and laser irradiation is performed in step S606, the observed data acquisition unit 504 acquires observation data from the irradiating device 153. The observation data indicating whether or not the end effector 101 has been observed at each moved position is passed on to the setting state calculator 505.

(Step S608)

In step S608, it is determined whether the irradiating device 153 has been subjected to the tilt change, the roll change, or the pan change, or whether it has not been subjected to any change based on the distribution of whether or not the end effector was observed for each position included in the location group that is included in the observation data acquired in step S607. Then the installed state of the irradiating device 153 is calculated.

A specific method for realizing the present embodiment will be explained with reference to FIG. 7 to FIG. 20.

Figure 7:
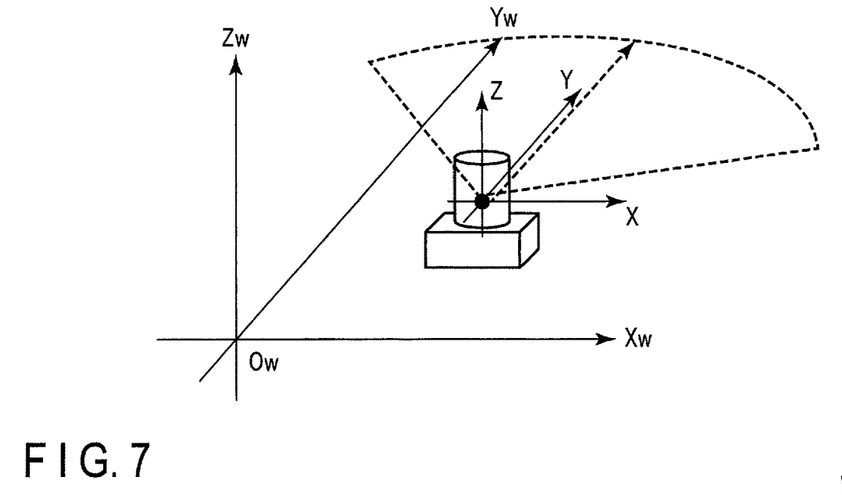
FIG. 7 is a diagram for explaining a coordinate system of the LRF, which is the irradiating device shown in FIG. 1, and a robot coordinate system (also referred to as a word coordinate system).

FIG. 7 explains a coordinate system of the LRF. In the LRF coordinate system used in the present embodiment, when the position of the LRF is considered as the origin, a front direction of the LRF (that is, a direction in which the laser irradiation is performed) is a Y axis, a direction orthogonal to the Y axis on a scanning surface is an X axis, and a direction perpendicular to the scanning surface is a Z axis. In the following explanation, this definition is used for the LRF coordinate system. The LRF coordinate system is not limited to this definition of the coordinate system. Furthermore, a robot coordinate system, in which the position of the robot is the origin, may also be used. In the robot coordinate system of the present embodiment, when the position of the robot is the origin, for example, an Xw axis and a Yw axis may be set so as to include a scanning surface in a surface including the Xw axis and the Yw axis, and a Zw axis may be set in a direction perpendicular to the scanning surface. Since coordinate conversion can be set for the LRF coordinate system and the robot coordinate system, which allows conversion therebetween, both coordinate systems can be used. Therefore, although the present embodiment is explained by mainly using the robot coordinate system, there is no particular preference.

Figure 8:
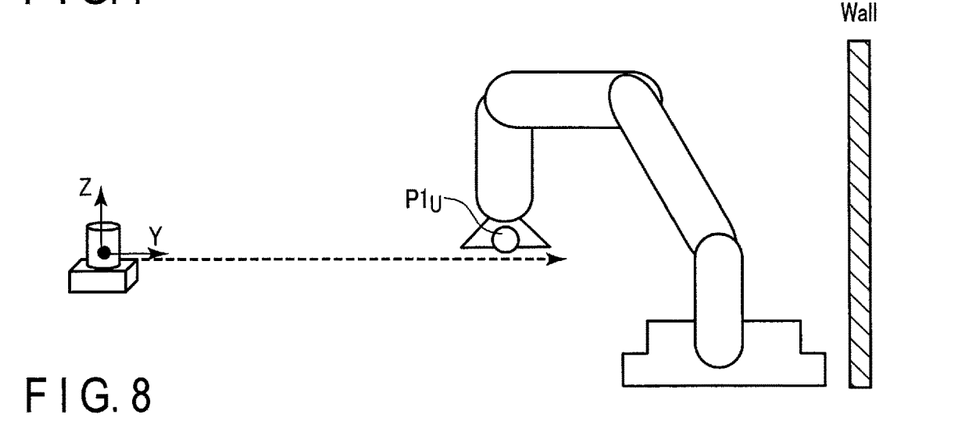
FIG. 8 shows an example of the positional relationship between the scanning surface and the distal end position in a case where the distal end position of the end effector is moved upwards from the scanning surface.
Figure 10:
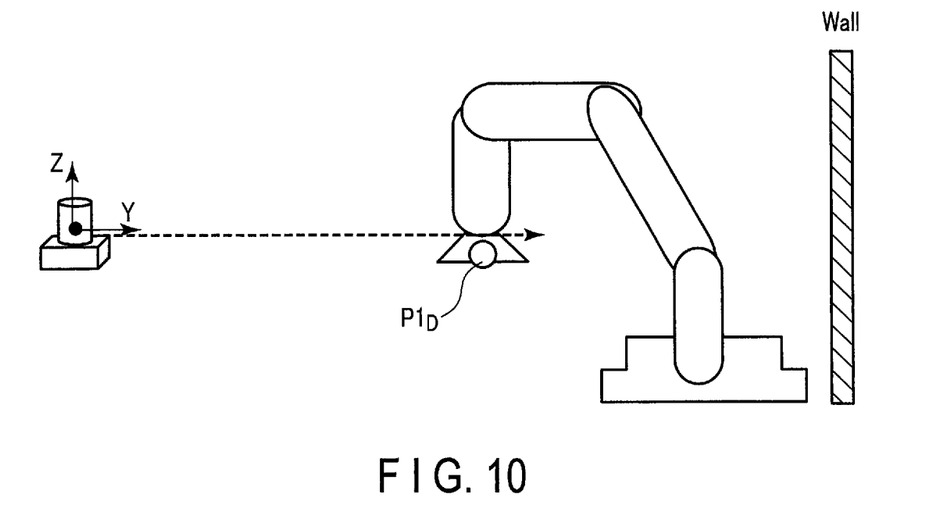
FIG. 10 shows an example of the positional relationship between the scanning surface and the distal end position in a case where the distal end position of the end effector is moved downwards from the scanning surface.

FIG. 8 and FIG. 10 show an observation aspect of a certain pair included in the location group at a position for checking (also referred to as a checking position). Each of the end-points of the end effector 101 is positioned at two points (here, the points positioned above and below will be referred to as $P1_U$ and $P_D$ (a pair of check positions)) positioned above and below the horizontal plane that was used when the location group data generator 501 generated the location group, and there is a wall behind the robot when viewed from the irradiating device 153. In FIG. 8, the end-point of the end effector 101 is not observed, and, in FIG. 10, the end-point of the end effector 101 is observed.

Figure 9:
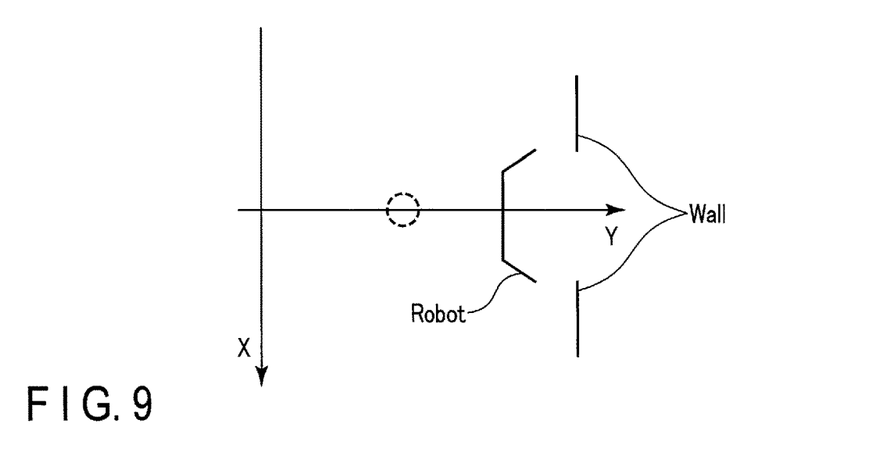
FIG. 9 schematically shows an observation result measured by the irradiating device in the positional relationship shown in FIG. 8.
Figure 11:
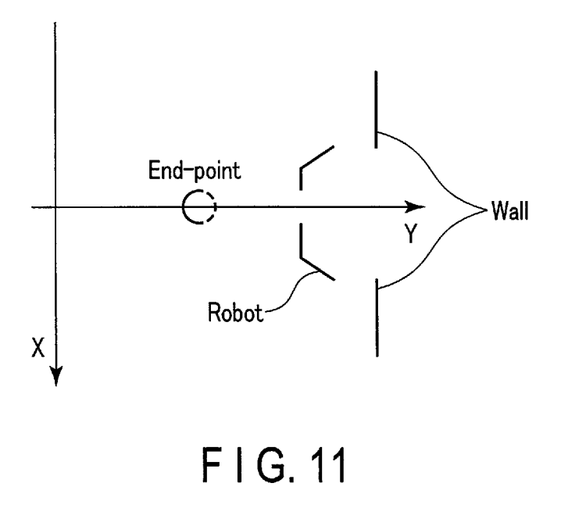
FIG. 11 schematically shows an observation result measured by the irradiating device in the positional relationship shown in FIG. 10.

FIG. 9 and FIG. 11 show a case in which the LRF data observed at the irradiating device 153 is indicated as X in the vertical axis and Y in the horizontal axis when the drawings correspond respectively to FIG. 8 and FIG. 10. The LRF data is data measured by the LRF, and data that indicates coordinates of an object present on the scanning surface. In FIG. 9, although the main body of the robot 100 and the wall behind it can be observed, the end-point of the end effector 101 cannot be observed and does not appear on the LRF data. On the other hand, in FIG. 10, the main body of the robot 100, the wall, and the end-point can be confirmed in the data. As mentioned in the explanation regarding the location group data generator 501, the X and Y coordinates of $P1_U$ and $P1_D$ mentioned above, which are a pair of location group data, are approximately the same, and the Z coordinates thereof are different in such a manner that $P1_U$ and $P1_D$ are positioned on opposite sides of the scanning surface. Such a combination of $P1_U$ and $P1_D$ is picked out when installing the irradiating device 153. The measurement result (check result; also referred to as an installed state) calculated by the setting state calculator 505 based on the observation data is stored in the memory 152. In a case where the check result obtained by performing the observation again after secular variation is different from the stored check result, the setting state calculator 505 is able to detect that there is a change in the scanning surface.

The degree of change to be detected can be adjusted by the magnitude of difference in the pair of the check positions in the Z direction included in the data generated by the location group data generator 501. In a case where the difference is small, a smaller change can be sensed. In a case where the difference is large, only significant changes will be detected. Furthermore, by increasing the number of positions that is included in a pair of one check position, it is possible to detect changes in multiple stages. For example, by increasing the check positions between $P1_U$ and $P1_D$, it is even possible to detect a change that is smaller than the change detected by a pair of two positions. The setting state calculator 505 is then be able to calculate and determine the degree of variation. Similarly, by increasing the check positions outward, a larger change can be determined.

Figure 12:
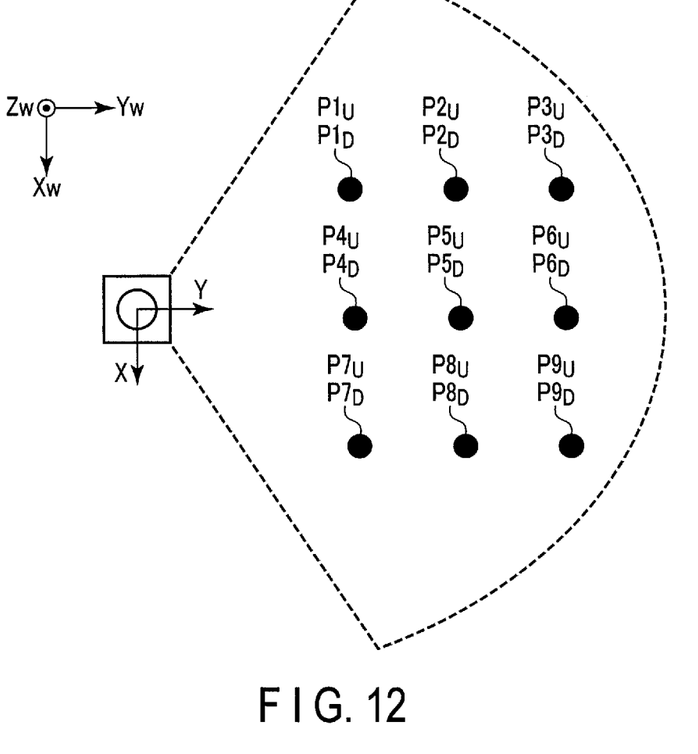
FIG. 12 is a diagram that views the scanning surface of the LRF, which is the irradiating device shown in FIG. 1, and a plurality of typical check positions (also referred to as a location group) from above the scanning surface.
Figure 13:
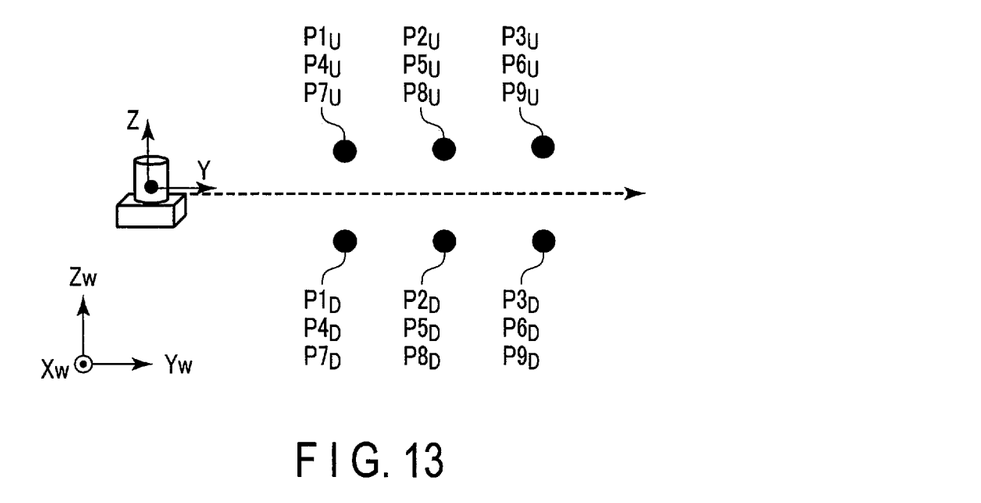
FIG. 13 is a diagram that views the scanning surface and the plurality of check positions from the side of the scanning surface in a case where the irradiating device and the distal end position of the end effector shown in FIG. 1 are positioned in desired relative positions.
Figure 14:
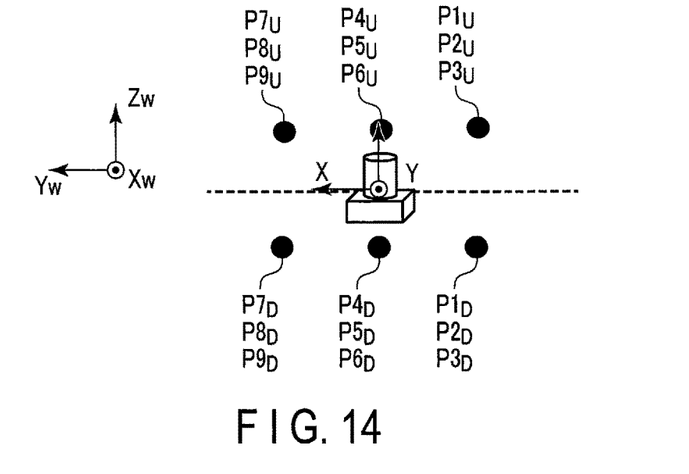
FIG. 14 is a diagram that views the irradiating device, the scanning surface, and the plurality of check positions shown in FIG. 12 from the front (a side on which laser irradiation is performed) of the scanning surface.
Figure 15:
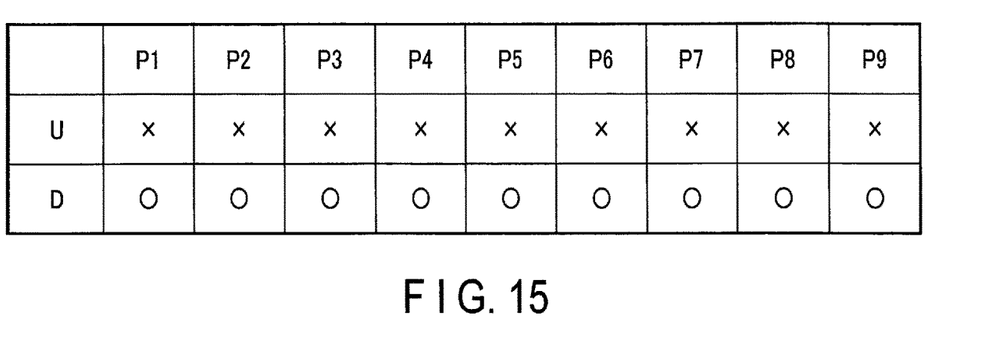
FIG. 15 shows an example of observation data in the case where the scanning surface and the plurality of check positions are in the positional relationship shown in FIG. 12 and FIG. 13.

Furthermore, by preparing a plurality of pairs of check positions, the kind of change that has occurred to the scanning surface can also be determined. FIG. 12, FIG. 13, and FIG. 14 show manners of arranging nine pairs of check positions. These drawings show manners of arranging nine pairs of check points which are obtained by pairing up two positions of 18 check positions. $P1_U$ to $P9_U$ are present on the upper side of the scanning surface in the Z direction. $P1_D$ to $P9_D$ are paired up respectively with $P1_U$ to $P9_U$ on a plane approximately parallel to the scanning surface, and are arranged on a plane approximately parallel on the lower side of the opposite side of the scanning surface in the Z direction. In these drawings, each pair of the nine pairs of check positions is present on a three by three lattice point. In a case where a hand enters from the upper side of the Z direction, usually, in an initial position setting of the irradiating device 153, the check result in FIG. 15 is obtained at each position. In the table of FIG. 15, "○" expresses a case in which the hand is observed, and "×" expresses a case in which the hand is not observed. Information on the pair of check positions and the check result is stored in the memory 152 by the setting state calculator 505.

Furthermore, in FIG. 12, FIG. 13, and FIG. 14 mentioned above, the pair of check positions is arranged on a lattice point; however, the arrangement and number are not limited thereto, and other arrangements may also be considered. For example, the number may be changed in accordance with the distance. The measuring performed by the LRF forms a scanning surface by preforming measurement on a straight line for each certain angle from the origin. Therefore, since the measuring density becomes lower as the distance becomes further, a larger number of check positions is arranged to enhance the accuracy of determination. In contrast, at a closer position, the number of check positions can be reduced.

The check position is set by the location group data generator 501. The check position may be set based on a design value of the scanning surface, or by moving the hand in the vicinity thereof and exploring. While moving the check position in a direction approximately perpendicular to the scanning surface in the vicinity of the scanning surface position, positions at which the hand is/is not observed are explored, and a pair of such positions is considered as a pair of a check position. Furthermore, it is preferable to prepare a plurality of such pairs since the change can be detected more efficiently.

Figure 16:
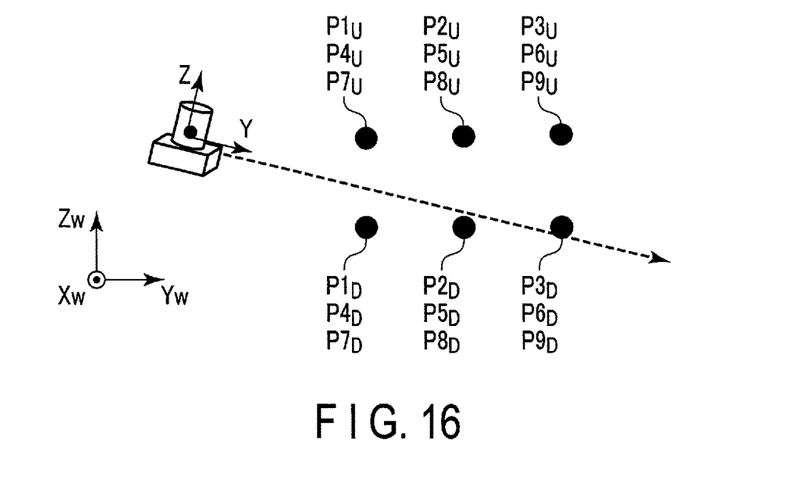
FIG. 16 is a diagram that views the scanning surface and the plurality of check positions from the side of the scanning surface in a case where the irradiating device shown in FIG. 1 is changed to a tilt direction.
Figure 17:
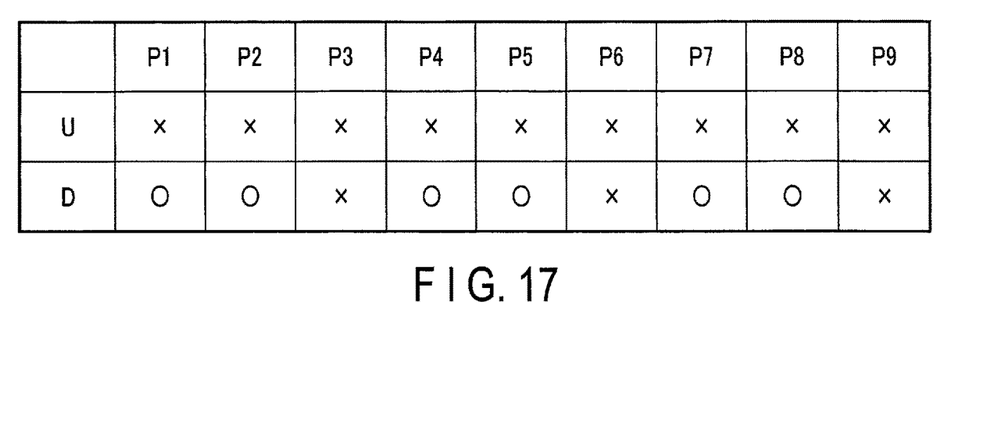
FIG. 17 shows an example of observation data in the case where the scanning surface and the plurality of check positions are in the positional relationship shown in FIG. 16.

FIG. 17 shows an example of the check result years after installation. When comparing the check results shown in FIG. 17 with the check results shown in FIG. 15, the results differ in $P3_D$, $P6_D$, and $P9_D$, thereby showing that an occurrence of change is detected. FIG. 16 shows an aspect of the change in the LRF at this time, and indicates that the tilt direction of the LFR has been changed downwards from the initial state. Since the dotted arrow of FIG. 16 expresses the scanning surface, and $P3_D$, $P6_D$, and $P9_D$ are on the upper side of the scanning surface, it may be understood that the hand is not observed at the LRF. When comparing the check results in the above manner, in addition to the change thereof, the direction of the change can also be detected.

Figure 18:
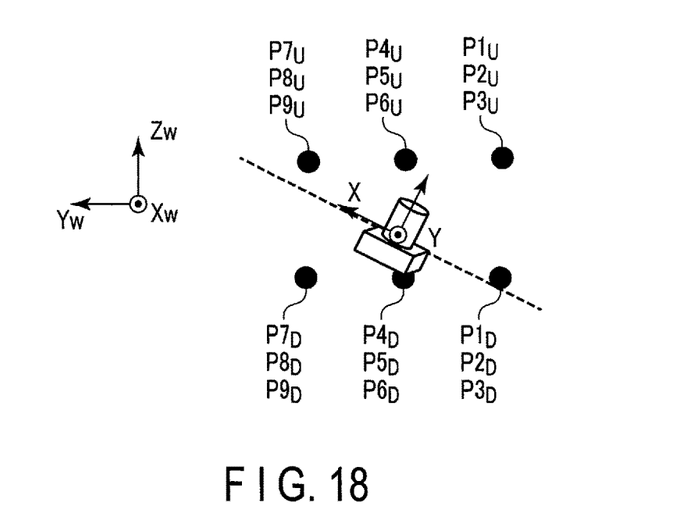
FIG. 18 is a diagram that views the scanning surface and the plurality of check positions from the front of the scanning surface in a case where the irradiating device shown in FIG. 1 is changed to a roll direction.
Figure 19:
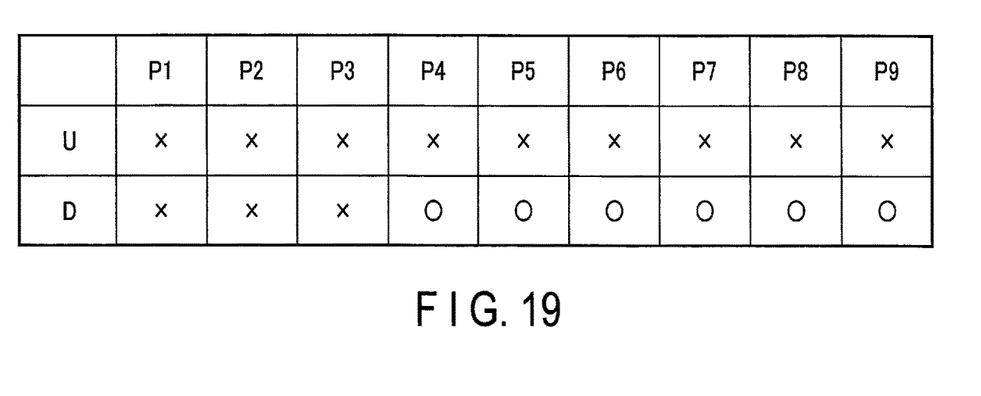
FIG. 19 shows an example of observation data in the case where the scanning surface and the plurality of check positions are in the positional relationship shown in FIG. 18.

FIG. 19 shows another example of the check result years after installation. When comparing the check results shown in FIG. 19 with the check results shown in FIG. 15, the results differ in $P1_D$, $P2_D$, and $P3_D$, thereby showing that an occurrence of change is detected. FIG. 18 shows an aspect of the change in the LRF at this time, and indicates that the roll direction has changed. Since the dotted line in the drawing expresses the scanning surface, and $P1_D$, $P2_D$, and $P3_D$ are on the upper side of the scanning surface, it may be understood that the hand is not observed at the LRF. When comparing the check results in the above manner, in addition to the change thereof, the direction of the change can also be detected. Furthermore, as can be understood with reference to FIG. 15 to FIG. 19, the setting state calculator 505 can determine the kind of secular variation that has occurred to the irradiating device 153 by the observation result at the location group designated in a first space which is in a range on the lower side of the two spaces that are obtained by dividing a space by a planar region.

Secular variation in the pan direction can also be detected in a similar manner by applying the method mentioned above.

[Operation Example]

Figure 20:
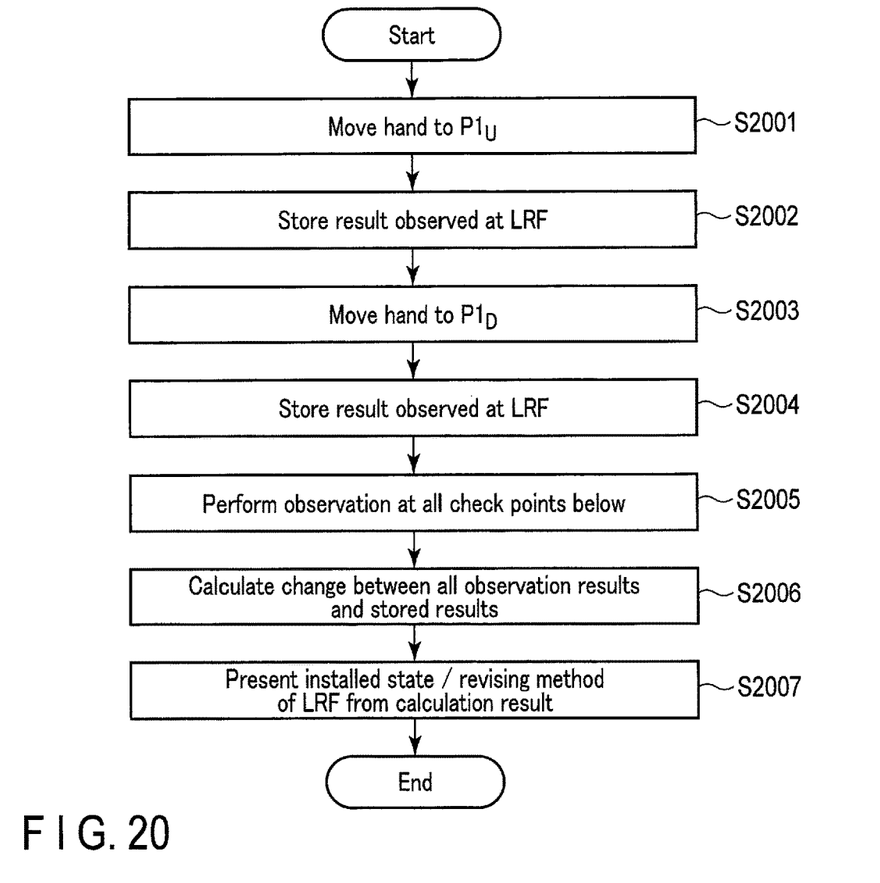
FIG. 20 is a flowchart schematically exemplifying an example of a processing procedure of the calibration detecting apparatus, the robot, and the irradiating device according to the embodiment.

FIG. 20 shows an example of the processing flow when using the pairs of check positions shown in FIG. 12, FIG. 13, and FIG. 14.

FIG. 20 is a flowchart exemplifying an example of processing procedures of the robot controller 151 and the calibration detecting apparatus 154. The processing procedure explained below is only an example. Therefore, each processing may be changed wherever possible. Regarding the processing procedure explained below, steps may be omitted, replaced, and added as appropriate in accordance with the embodiment.

(Activation)

First, a user, etc. activates the robot 100, the calibration detecting apparatus 154, and the irradiating device 153 (LRF) via the input device 2206 explained later, and, further, receives input of settings, etc. The robot controller 151 and the calibration detecting apparatus 154 perform the processing in accordance with the following processing procedure.

(Step S2001)

In step S2001, the robot controller 151 acquires transfer data that the transfer data generator 502 generated based on the location group data from the memory 152, and moves the hand to $P1_U$ based on the transfer data.

(Step S2002)

In step S2002, the observed data acquisition unit 504 acquires observation data observed by the irradiating device 153 in a state where the hand is at $P1_U$, and temporarily stores the observation data acquired at each check position until all of the positions that are scheduled to be observed are observed. This observation data may be temporarily stored in the memory 152 from the observed data acquisition unit 504, or may be temporarily stored in a memory, etc. that is included in the observed data acquisition unit 504.

(Step S2003)

In step S2003, the robot controller 151 acquires transfer data that the transfer data generator 502 generated based on the location group data from the memory 152, and moves the hand to Pip based on the transfer data.

(Step S2004)

In step S2004, the observed data acquisition unit 504 acquires observation data observed by the irradiating device 153 in a state where the hand is at $P1_D$, and temporarily stores the observation data acquired at this check position.

(Step S2005)

In step S2005, steps S2001 to S2004 are executed for all of the scheduled check positions, to acquire observation data for all of the check positions.

(Step S2006)

In step S2006, based on the observation data of all of the check positions obtained up to step S2005, the setting state calculator 505 calculates whether or not the installed state of the irradiating device 153 has changed from the previous result. The previous result may be stored in advance in a memory, etc. by the setting state calculator 505, or may be stored in the memory 152.

(Step S2007)

Figure 21:
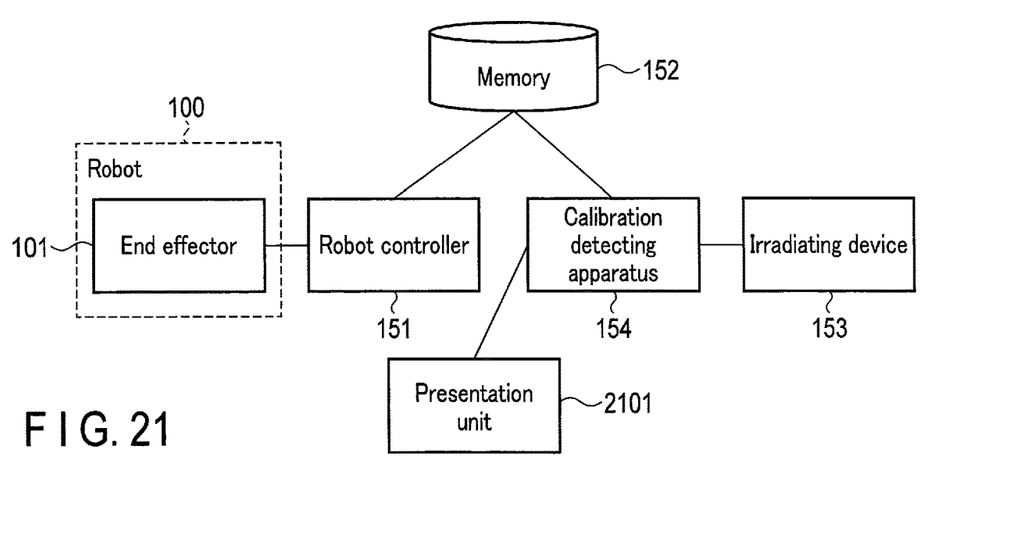
FIG. 21 shows an overview of the system in a case where a presentation unit is connected to the calibration detecting apparatus of FIG. 1.

In step S2007, for example, a presentation unit 2101 as shown in FIG. 21 may be newly provided to present the installed state of the irradiating device 153 obtained in step S2006. Furthermore, in step S2007, the direction in which and the extent to which the irradiating device 153 should be moved and/or rotated may be calculated by the setting state calculator 505, and a revising method may be presented by the presentation unit 2101.

The result to be presented by the presentation unit 2101 may only be the result of whether or not a change has been detected, or may be the kind of change that has occurred, that is, the change that occurred in each of the tilt, roll, and/or pan, or the amount of change thereof, etc. The above results may be presented by various methods, such as by display, sound, audio, file output, etc. However, the method is not limited thereto. If presenting the results by display, the results may be displayed by preparing a dedicated display, or a console screen for robots, etc., as long as it is perceptible by the user. In the case of sound or audio, the results may be presented by a buzzer sound or music, etc. by a buzzer or a loudspeaker.

[Configuration Example]

(Hardware Configuration)

<Calibration Detecting Apparatus>

An example of a hardware configuration of the calibration detecting apparatus 154 according to the present embodiment will be explained with reference to FIG. 22. The hardware configuration described herein is basically the same as that of the robot 100 or the irradiating device 153.

Figure 22:
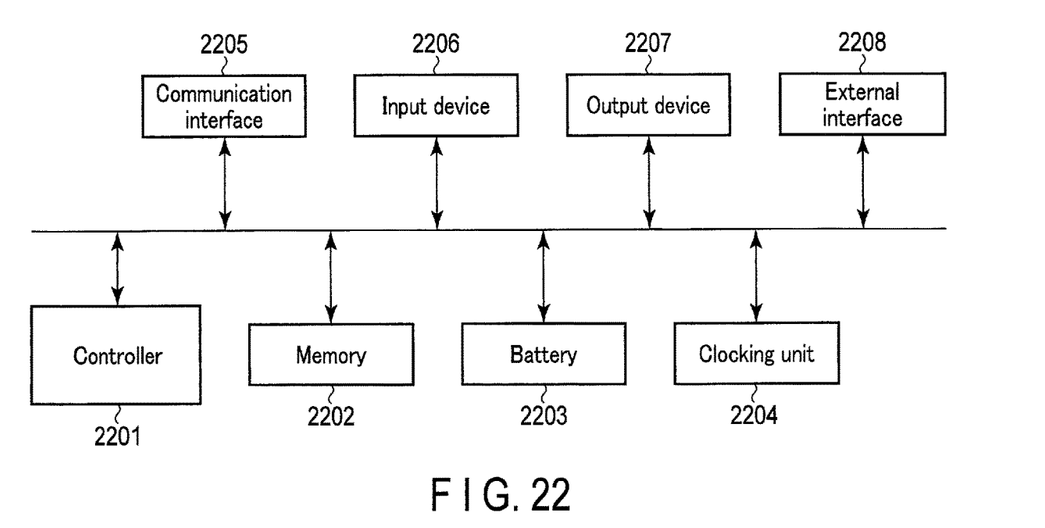
FIG. 22 schematically shows an example of a hardware configuration of the calibration detecting apparatus, etc. of FIG. 1.

As shown in FIG. 22, the calibration detecting apparatus 154 according to the present embodiment comprises a computer electrically connected to a controller 2201, a memory 2202, a battery 2203, a clocking unit 2204, a communication interface 2205, an input device 2206, an output device 2207, and an external interface 2208. In FIG. 22, the communication interface and the external interface are described as "communication I/F" and "external I/F", respectively.

The controller 2201 includes a Central Processing Unit (CPU), a Random Access Memory (RAM), and/or a Read Only Memory (ROM), etc., and controls each constituent element in accordance with information processing. The controller 2201 executes a program for setting the irradiating device 153 in such a manner that laser irradiation is performed on the distal end position of the end effector, followed by moving the distal end position of the end effector to a position indicated by the preset location group data to acquire observation data obtained by performing laser irradiation on each of the positions to which the distal end position is moved, and calculating the installed state of the irradiating device 153 from this observation data. This program is stored in the memory 2202. The controller 2201 calls the execution program from the memory 2202 and executes the processing.

The memory 2202 is a medium for electrically, magnetically, optically, mechanically, or chemically accumulating information, such as the program, so that a computer or other devices and machines, etc. can read the information of the recorded program, etc. The memory 2202 is, for example, an auxiliary storage device of a hard disk drive or a solid state drive, etc., and executes a program for setting the irradiating device 153 in such a manner that laser irradiation is performed on the distal end position of the end effector, followed by moving the distal end position of the end effector to a position indicated by the preset location group data to acquire observation data obtained by performing laser irradiation on each of the positions to which the distal end position is moved, and calculating the installed state of the irradiating device 153 from this observation data.

The memory 2202 also stores the transfer data, the observation data, and the installed state data generated by the program executed by the controller 2201. The memory 2202 may also store presentation data for the presentation unit 2101 to present the installed state and/or the revising method.

Furthermore, the memory 2202 may include a drive. The drive receives the stored data from the auxiliary storage device and recording medium, etc., and is particularly a device for reading programs. The drive is, for example, a semiconductor memory drive (flash memory drive), a compact disk (CD) drive, and a digital versatile disk (DVD) drive. The type of drive may be selected as appropriate in accordance with the type of storage medium. The data, etc. acquired from the above execution program may be stored in this storage medium.

The battery 2203 may be any battery as long as it can supply power to a device part included in the calibration detecting apparatus 154. Therefore, it may be, for example, a rechargeable secondary battery or an alternating-current power supply acquired from a normal outlet. The battery 2203 supplies power to each element mounted on the calibration detecting apparatus 154 main body. The battery 2203 supplies power to, for example, the controller 2201, the memory 2202, the clocking unit 2204, the communication interface 2205, the input device 2206, the output device 2207, and the external interface 2208.

The clocking unit 2204 is a unit that measures time, and is capable of measuring the date and time. For example, the clocking unit 2204 is a clock including a calendar, and passes on information of the current year, month, and/or date and time to the controller 2201. The clocking unit 2204 is utilized when, for example, adding the date and time of when the observation data and the installation data, etc. are generated by the controller 2201.

The communication interface 2205 is, for example, a short-range wireless communication (for example, Bluetooth (registered trademark)) module, a wired local area network (LAN) module, a wireless LAN module, etc., and is an interface for performing wired or wireless communication via a network. The communication interface 2205 is an interface for connecting the calibration detecting apparatus 154 with an external device (for example, the robot 100, the robot controller 151, the irradiating device 153, the presentation unit 2101; or a computer, a server, a communication device on a network). The communication interface 2205 is controlled by the controller 2201, and is for receiving index data from devices of other servers, etc. and/or other terminal devices via the network, etc., and/or is for transmitting display data and support data generated by the calibration detecting apparatus 154 to the terminal device 102 (for example, a smartphone and/or a computer), etc. through the network, etc. The communication interface 2205 may also serve to store a program to be executed by the calibration detecting apparatus 154 on a specific server, etc. (not shown) in advance, and download this program from this specific server, or may serve to upload this program on the terminal device 102. In the case of receiving this program by the terminal device 102, the terminal device 102 executes this program and generates the display data and the support data. These data will then be presented on the terminal device 102.

Furthermore, the communication via this network, etc. may be wireless or wired. The network, etc. may be an Internet network including the Internet, other types of networks such as an in-house LAN, or a one-on-one communication using a Universal Serial Bus (USB) cable, etc. The communication interface 2205 may include a micro USB connector.

The input device 2206 is a device for receiving input, and is, for example, a touch panel, a physical button, a mouse, and a keyboard. The output device 2207 is a device for performing output, and outputs information by display or audio, etc. The output device 2207 is, for example, a display and a loudspeaker. The index data may be input by the input device 2206.

The external interface 2208 is a medium between the main body of the calibration detecting apparatus 154 and the external device, and is, for example, a USB port, and is an interface to connect with the external device (for example, a printer, a memory, and a communication device).

As mentioned above, according to the calibration detecting apparatus of the present embodiment, the location group data generator 501 generates the location group data indicating a location group that includes at least a pair of a plurality of positions arranged respectively in the two spaces obtained by dividing a space by a planar region including the distal end position (end-point position) of the end effector 101 and a position at which the laser source of the irradiating device 153 is installed. Therefore, a check position for acquiring data for examining the setting state of the irradiating device 153 can be set. Furthermore, since the transfer data generator 502 is capable of generating transfer data for moving the end effector 101 to a check position based on the location group data, the robot controller 151 is capable of controlling the end effector 101 and sequentially moving the distal end position to the check position based on this transfer data.

On the other hand, since the irradiating position setting unit 503 is capable of setting an irradiation arrangement of the irradiating device 153 so that the irradiating device 153 performs laser irradiation on a region including the distal end position of the end effector 101, it is possible to acquire observation data at the time of attaching or installing the irradiating device 153. The observed data acquisition unit 504 acquires observation data indicating whether or not the observed data acquisition unit 504 has been able to observe the end effector 101 for each check position to which the end effector 101 has been moved based on the transfer data of the transfer data generator 502. The setting state calculator 505 calculates the change in the installed state of the irradiating device 153 based on the observation data. Therefore, it becomes possible to compare the observation data obtained upon attachment or installation with the observation data obtained at a plurality of check positions over time. Since it becomes possible to calculate in which direction and to what extent the irradiating device 153 has moved, the secular variation in the installation and direction of the irradiating device 153 can be detected.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

<1>

The apparatus of the present embodiments can also be realized by a computer and a program, and can also record the program on a recording medium (or a storage medium), or provide the program through a network.

Furthermore, each of the above devices and the device parts thereof can be implemented respectively by a hardware configuration or a configuration in which hardware resources and software are combined. As software of the combined configuration, a program for causing a computer to realize operations (or functions) of each device is used by installing the program on the computer from a network or a computer-readable medium (or a storage medium) in advance, and having the program executed by a processor of the computer.

<2>

Furthermore, "and/or" indicates one or more optional matters among the matters joined and recited by "and/or". As a specific example, "x and/or y" indicates one of the elements among group {(x), (y), (x,y)} that includes three elements. As another specific example, "x, y, and/or z" indicates one of the elements among group {(x), (y), (z), (x,y), (x,z), (y,z), (x,y,z)} that includes seven elements.

What is claimed is:

1. A calibration detecting apparatus comprising:
a memory configured to store computer-executable instructions; and
a hardware processor in communication with the memory and configured to execute the computer-executable instructions to at least:
generate location group data indicating a location group that includes at least a pair of at least two positions arranged respectively in two spaces which are obtained by dividing a space by a planar region including a distal end position of an end effector and a position of a laser source;
set an irradiation arrangement so that an irradiating device performs laser irradiation on a region including the distal end position;
generate transfer data for moving the distal end position to at least one position among positions indicated by the location group data, the at least one position being designated within a range including a first space which is at least one of the two spaces;
acquire observation data indicating whether or not the end effector is observed by performing laser irradiation in a state of the irradiation arrangement each time the distal end position is moved in accordance with the transfer data; and
calculate a change in an installed state of the irradiating device based on the observation data.

2. The apparatus according to claim 1, wherein
if the observation data indicates that there is a position at which the end effector fails to be observed in the first space, the hardware processor calculates that the installed state is changed.

3. The apparatus according to claim 1, wherein
the hardware processor generates the transfer data of both spaces including a second space which is the other space of the two spaces, and
if the observation data indicates that the end effector is observed in the first space and fails to be observed in the second space, the hardware processor calculates that the installed state fails to be changed.

4. The apparatus according to claim 1, wherein
if the observation data indicates that all of the positions at which the end effector fails to be observed are distant from the irradiating device by more than a certain distance, the hardware processor calculates that the installed state of a laser changes to face downwards.

5. The apparatus according to claim 1, wherein
the hardware processor generates location group data in which the location group is set in a first region which is present in a direction from the irradiating device to the distal end position, and second regions which are on both sides of the first region, in the planar region.

6. The apparatus according to claim 5, wherein
if the observation data indicates that a position at which the end effector fails to be observed is one of both sides of the second regions, the hardware processor calculates that the irradiating device is in a state of being rotated about an irradiation direction of the laser.

7. The apparatus according to claim 1, wherein
the hardware processor sets the irradiation arrangement so that laser irradiation is performed on a planar region including the distal end position.

8. The apparatus according to claim 1, wherein
the hardware processor generates location group data in which the location group includes a plurality of pairs, and is arranged respectively at different positions.

9. The apparatus according to claim 1, wherein
the hardware processor generates location group data in which each of the location groups is arranged at equal distances from the planar region.

10. The apparatus according to claim 1, wherein the hardware processor is further configured to generate revising data indicating how the irradiation arrangement is revised based on the change in the installed state.

11. The apparatus according to claim 10, further comprising a user interface device that presents the revising data.

12. The apparatus according to claim 1, wherein
the hardware processor generates the location group data by adopting a horizontal planar region as the planar region and arranging the position symmetrically with respect to the horizontal planar region.

13. The apparatus according to claim 12, wherein
the hardware processor generates transfer data for moving the distal end position to at least one position designated within a range including at least a lower side region of the horizontal planar region.

14. A robot comprising the calibration detecting apparatus according to claim 1.

15. An irradiating device comprising the calibration detecting apparatus according to claim 1.

16. A calibration detecting method comprising:
generating location group data indicating a location group that consists of includes at least a pair of at least two positions arranged respectively in two spaces which are obtained by dividing a space by a planar region including a distal end position of an end effector and a position of a laser source;
setting an irradiation arrangement so that an irradiating device performs laser irradiation on a region including the distal end position;
generating transfer data for moving the distal end position to at least one position among positions indicated by the location group data, the at least one position being designated within a range including a first space which is at least one of the two spaces;
acquiring observation data indicating whether or not the end effector is observed by performing laser irradiation in a state of the irradiation arrangement each time the distal end position is moved in accordance with the transfer data; and
calculating a change in an installed state of the irradiating device based on the observation data.

17. A non-transitory computer readable medium storing a computer program which is executed by a computer to provide the steps of:
generating location group data indicating a location group that consists of includes at least a pair of at least two positions arranged respectively in two spaces which are obtained by dividing a space by a planar region including a distal end position of an end effector and a position of a laser source;

setting an irradiation arrangement so that an irradiating device performs laser irradiation on a region including the distal end position;

generating transfer data for moving the distal end position to at least one position among positions indicated by the location group data, the at least one position being designated within a range including a first space which is at least one of the two spaces;

acquiring observation data indicating whether or not the end effector is observed by performing laser irradiation in a state of the irradiation arrangement each time the distal end position is moved in accordance with the transfer data; and calculating a change in an installed state of the irradiating device based on the observation data.

\* \* \* \* \*